United States Patent
Arita et al.

(10) Patent No.: US 8,602,762 B2
(45) Date of Patent: Dec. 10, 2013

(54) RESIN GRANULATING APPARATUS

(75) Inventors: Keizo Arita, Takasago (JP); Yasuo Yoshii, Takasago (JP); Kazuo Iritani, Takasago (JP); Osamu Ikeda, Takasago (JP); Yoshiaki Nakata, Takasago (JP); Shin Iwasaki, Takasago (JP)

(73) Assignee: Kobe Steel, Ltd., Kobe-shi (JP)

( * ) Notice: Subject to any disclaimer, the term of this patent is extended or adjusted under 35 U.S.C. 154(b) by 649 days.

(21) Appl. No.: 12/718,341

(22) Filed: Mar. 5, 2010

(65) Prior Publication Data
US 2010/0233307 A1 Sep. 16, 2010

(30) Foreign Application Priority Data

Mar. 10, 2009 (JP) ................................. 2009-056517

(51) Int. Cl.
*B29B 9/06* (2006.01)
(52) U.S. Cl.
USPC ............... 425/142; 425/67; 425/69; 425/310; 425/311; 425/313
(58) Field of Classification Search
CPC .......................... B29B 9/065; B29C 2793/009
USPC ................. 425/67, 68, 69, 70, 310, 311, 313, 425/382 R, 382.3, 150, 142; 264/143, 141
See application file for complete search history.

(56) References Cited

U.S. PATENT DOCUMENTS

| | | | |
|---|---|---|---|
| 3,478,623 A * | 11/1969 | Noguchi | 475/165 |
| 3,685,751 A * | 8/1972 | Anders | 425/171 |
| 3,792,950 A * | 2/1974 | Cuff | 425/313 |
| 3,912,434 A | 10/1975 | Nagahara et al. | |
| 4,509,408 A * | 4/1985 | Kuroda | 92/2 |
| 4,529,370 A | 7/1985 | Holmes et al. | |
| 4,614,307 A * | 9/1986 | Lauser | 241/101.4 |
| 5,056,997 A * | 10/1991 | Hayashi et al. | 425/130 |
| 5,059,103 A * | 10/1991 | Bruckmann et al. | 425/67 |
| 5,110,523 A * | 5/1992 | Guggiari | 264/40.5 |

(Continued)

FOREIGN PATENT DOCUMENTS

| | | |
|---|---|---|
| EP | 0 418 941 A2 | 3/1991 |
| EP | 0 418 941 A3 | 3/1991 |
| JP | 6-297451 | 10/1994 |

OTHER PUBLICATIONS

Japanese Office Action issued Jan. 15, 2013 in Patent Application No. 2009-056517 with English Translation.

(Continued)

*Primary Examiner* — Seyed Masoud Malekzadeh
(74) *Attorney, Agent, or Firm* — Oblon, Spivak, McClelland, Maier & Neustadt, L.L.P.

(57) ABSTRACT

In a resin granulating apparatus of the present invention, a bracket extending in the outward radial direction over an outer peripheral surface of a sleeve is provided for the sleeve for rotatably supporting a cutter shaft of a cutter for shearing a material extruded from a die. Stopper means cooperating with the bracket to regulate movement of the sleeve toward the die and moving a regulation position in the axial direction is provided on the radially outer side over an outer diameter of the sleeve. With such a configuration, installation space is compactified so as to additionally provide the stopper means in the existing facilities, and a position of the cutter relative to a die surface is precisely adjusted so as to stably produce a pellet of a best shape.

10 Claims, 5 Drawing Sheets

(56) References Cited

U.S. PATENT DOCUMENTS

| | | | |
|---|---|---|---|
| 5,190,768 A * | 3/1993 | Ishida et al. | 425/67 |
| 5,360,585 A * | 11/1994 | Ishida et al. | 264/40.1 |
| 5,435,713 A * | 7/1995 | Yamasaki et al. | 425/311 |
| 5,481,188 A * | 1/1996 | Mizutani | 324/207.25 |
| 5,527,176 A * | 6/1996 | Ishida | 425/142 |
| 5,587,186 A * | 12/1996 | Voigt | 425/310 |
| 6,443,722 B1 * | 9/2002 | Castelli et al. | 425/145 |
| 6,551,087 B1 * | 4/2003 | Martin | 425/67 |
| 6,925,741 B2 * | 8/2005 | Eloo et al. | 425/67 |
| 7,007,559 B2 * | 3/2006 | Klammer et al. | 73/862.08 |
| 7,033,152 B2 * | 4/2006 | Eloo et al. | 425/67 |
| 8,056,458 B2 * | 11/2011 | Edelman et al. | 83/582 |
| 2003/0112482 A1 * | 6/2003 | Fujinawa et al. | 358/513 |
| 2004/0009254 A1 * | 1/2004 | Eloo et al. | 425/311 |
| 2004/0080066 A1 | 4/2004 | Klammer et al. | |
| 2006/0267239 A1 * | 11/2006 | Balyberdin et al. | 264/140 |
| 2009/0062427 A1 * | 3/2009 | Tornow et al. | 523/223 |

OTHER PUBLICATIONS

U.S. Appl. No. 13/695,545, filed Oct. 31, 2012, Iwasaki, et al.

* cited by examiner

RESIN GRANULATING APPARATUS

BACKGROUND OF THE INVENTION

1. Field of the Invention

The present invention relates to a resin granulating apparatus provided in a mixer or an extruder.

2. Description of the Related Art

A resin granulating apparatus for producing a pellet of resin is to granulate the resin by cutting molten resin extruded from a die into water by a rotating cutter. This cutter is rotated while pressed from the normal direction relative to a die surface. When a blade of the cutter is in close contact with the die surface without any gap therebetween, the material is cut into a pellet of a best shape. However, abrasion is easily generated in the blade of the cutter, and in accordance with progress of the abrasion, the gap between the cutter and the die surface tends to be increased. The blade of the cutter may be strongly pressed onto the die surface so as to bring the blade of the cutter into close contact with the die surface without any gap therebetween. However, there is a fear that with excessive pressing force, the abrasion of the cutter is accelerated so as to shorten the life of the cutter.

Therefore, a conventional resin granulating apparatus is provided with stopper means for pressing the cutter onto the die surface and regulating the blade of the cutter not to come close to the die surface more than necessary. For example, Japanese Patent Laid-Open No. 1994-297451 discloses stopper means provided on a cutter shaft on the side of the die relative to a sleeve for retaining the cutter shaft for rotating the cutter through bearings. This stopper means is provided with a spinning disc and a nut disc both of which are rotatably attached to the cutter shaft. The nut disc is moved relatively to the spinning disc so as to adjust a position of the cutter relative to the die.

However, when a gear mechanism such as the spinning disc and the nut disc is provided on the cutter shaft on the side of the die relative to the sleeve, the cutter shaft is elongated in the axial direction, and a housing for accommodating this cutter shaft is also elongated in the axial direction. Therefore, in the resin granulating apparatus of the patent publication above which needs large space for installation, there is a problem that the installation is difficult in a case of limited installation space.

When the cutter shaft is elongated on the side of the relative to the sleeve, the cutter shaft is naturally easily bent and curved. The cutter is attached to a front end of the cutter shaft so that a blade edge is perpendicular to the axial direction. When the cutter shaft is bent, there is a fear that the direction of the cutter is inclined so that the cutter is not easily in contact with the die surface. As a result, it is not possible to cut the resin while pressing the cutter onto the die surface without any gap therebetween, and thus there is a fear that a pellet of a good shape is not obtained.

Further, there is a demand for additionally providing the stopper means as in the patent publication above in the conventional resin granulating apparatus. However, the cutter shaft of the conventional resin granulating apparatus having no stopper means often does not have enough length for additionally installing the gear mechanism described above. For additionally installing such stopper means, there is a need for replacing all the cutter shaft, the housing and the like. In consideration with the installation space and stable supply of the pellet of the good shape, there may be some barriers in application to the existing facilities.

SUMMARY OF THE INVENTION

The present invention is achieved in consideration with the problems above, and an object of the present invention is to provide a resin granulating apparatus whose installation space is compact and which is capable of stably producing a pellet of a good shape without sacrificing attachment precision of a cutter to a die surface.

In order to achieve the above object, the following technical means are provided in the present invention.

That is, a resin granulating apparatus of the present invention includes a die, a cutter for shearing a molten resin material extruded from the die, a cutter shaft for rotating the cutter around an axis, a sleeve for supporting the cutter shaft rotatably around the axis, the sleeve being arranged so as to move along the axial direction integrally with the cutter shaft, a housing for supporting the sleeve movably along the axial direction, pressing means for pressing the sleeve toward the die in the axial direction, a bracket provided for the sleeve, the bracket extending in the outward radial direction over an outer peripheral surface of the sleeve, and stopper means provided on the radially outer side over an outer diameter of the sleeve, the stopper means cooperating with the bracket to regulate movement of the sleeve toward the die and moving a position at which the movement of said sleeve is regulated, in the axial direction.

With such a configuration, since the bracket provided for the sleeve extends in the outward radial direction over the outer peripheral surface of the sleeve, the stopper means can be provided on the radially outer side over the outer diameter of the sleeve. The stopper means acts on the bracket so as to regulate the movement of the sleeve toward the die. The bracket provided for the sleeve and the stopper means provided on the radially outer side over the outer diameter of the sleeve require less installation space in the axial direction than a case where the stopper means is provided on the cutter shaft on the side of the die relative to the sleeve. Therefore, it is possible to additionally install the stopper means in the existing facilities with limited installation space in the axial direction.

Since there is no need for providing the stopper means on the cutter shaft on the side of die relative to the sleeve, the cutter shaft is not elongated. Therefore, the cutter shaft is not easily bent, and the resin can be cut while a blade of the cutter is surely in surface contact with the die surface. Thus, it is possible to stably obtain the pellet of the good shape.

Preferably, the stopper means is provided with a regulating member provided on the side of the housing movably in the axial direction, the regulating member having a front end abutted with said bracket in the axial direction.

Since such stopper means is more easily and more freely arranged than a case where the stopper means is provided with the regulating member provided on the side of the bracket, the stopper means is easily applied to the existing facilities.

In such stopper means, the regulating member may be a rod shape regulating member attached to the side of the housing through a screw mechanism, and a position of the regulating member in the axial direction may be adjustable by changing a meshing state of the screw mechanism.

With such stopper means, the rod shape regulating member can be moved by the screw mechanism with small drive force, and the position of the regulating member can be strictly changed so as to more precisely adjust a position of the cutter relative to the die surface.

The stopper means may be provided with an elastic member for pressing the regulating member toward the bracket, and a lock member abutted with the regulating member pressed toward the bracket for regulating movement of the regulating member along the axial direction.

With such a configuration, when regulation by the lock member is released, the position of the regulating member is automatically changed by the pressing means for pressing the sleeve toward the die while the regulating member being pressed toward the bracket by the elastic member. Thus, it is possible to easily adjust the position of the cutter relative to the die with a simple structure.

Further, in the stopper means, a male screw portion may be provided on the outer peripheral side of the housing around the axis, a ring shape regulating member having a female screw portion to be screwed onto the male screw portion may be provided, and a position of the regulating member in the axial direction may be adjustable by changing a meshing state of both the screw portions.

In the stopper means, the regulating member may be a rod shape regulating member. The stopper means may have a socket member attached to the side of the housing through a screw mechanism, and an elastic member for pressing the regulating member toward the bracket, and the regulating member may be inserted into the socket member so that movement of the regulating member toward the die is restricted and movement thereof toward the bracket is free, and abutted with the bracket for regulating the movement of the sleeve in the axial direction.

It should be noted that in a case of adopting the screw mechanism, a front end of the rod shape regulating member is preferably formed in a spherical surface toward the bracket. With such a configuration, a contact area of the rod shape regulating member with the bracket is reduced, and the rod shape regulating member is easily rotated relative to the bracket.

Preferably, the stopper means is provided with a support member for supporting a base end of the regulating member, and the support member is detachably attached to the housing. With such a configuration, the stopper means is easily and additionally provided in the existing facilities provided with no mechanism for adjusting the position of the cutter.

It should be noted that a sensor for measuring pressing force of the cutter toward the die is preferably provided between the bracket and the regulating member. With such a configuration, without providing a sensor in a place having difficulty in installation and a bad environment such as the inside of the housing and the inside of a water chamber, it is possible to measure the pressing force of the cutter toward the die by the sensor provided on the radially outer side of the sleeve.

In a case where the regulating member or the socket member is attached through the screw mechanism, preferably, a rotation mechanism for rotating the regulating member or the socket member around the axis is provided for the regulating member or the socket member, and a relationship between a reduction ratio I of the rotation mechanism, and resolution performance 'm' of the regulating member and a pitch 'p' of the screw mechanism is set by the following expression (1):

$$I = 360/(m/p \times 360) \quad (1)$$

wherein I is the reduction ratio of the rotation mechanism, m is the resolution performance of the regulating member (mm), and p is the pitch of the screw mechanism (mm).

With such a configuration, the position of the regulating member is changed in accordance with rotation of the regulating member by the rotation mechanism, and it is possible to easily and precisely adjust the position of the regulating member.

Further, a motor for rotating the cutter shaft around the axis may be connected to the cutter shaft, and a position of the regulating member in the axial direction may be adjusted in accordance with mechanical power of the motor.

When the cutter is in strong contact with the die, friction between the die and the cutter increases the mechanical power of the motor. However, when contact stress is reduced due to abrasion of the cutter, the mechanical power of the motor is decreased. Therefore, by adjusting the pressing force by the pressing means and the position of the regulating member in accordance with the mechanical power of the motor as described above, it is possible to adjust the pressing force of the cutter in accordance with an abrasion state.

The resin granulating apparatus of the present invention allows the compact installation space and stable production of the pellet of the good shape without sacrificing the attachment precision of the cutter to the die surface.

DESCRIPTION OF THE PREFERRED EMBODIMENTS

Hereinafter, a resin granulating apparatus 1 according to a first embodiment of the present invention will be described based on the drawings.

The resin granulating apparatus 1 of the present invention is provided on the downstream side of an extruder or a continuous mixer serving as an apparatus for granulating a resin material M mixed and molten by the extruder or the continuous mixer so as to produce a pellet of the resin. In the present embodiment, the resin granulating apparatus 1 of the present invention will be described by taking the resin granulating apparatus provided on the downstream side of the extruder as an example. It should be noted that in the following description, the left side on a paper of FIG. 1 indicates the upstream side in the explanation of the resin granulating apparatus 1, and the right side on the paper indicates the downstream side.

Figure 1:
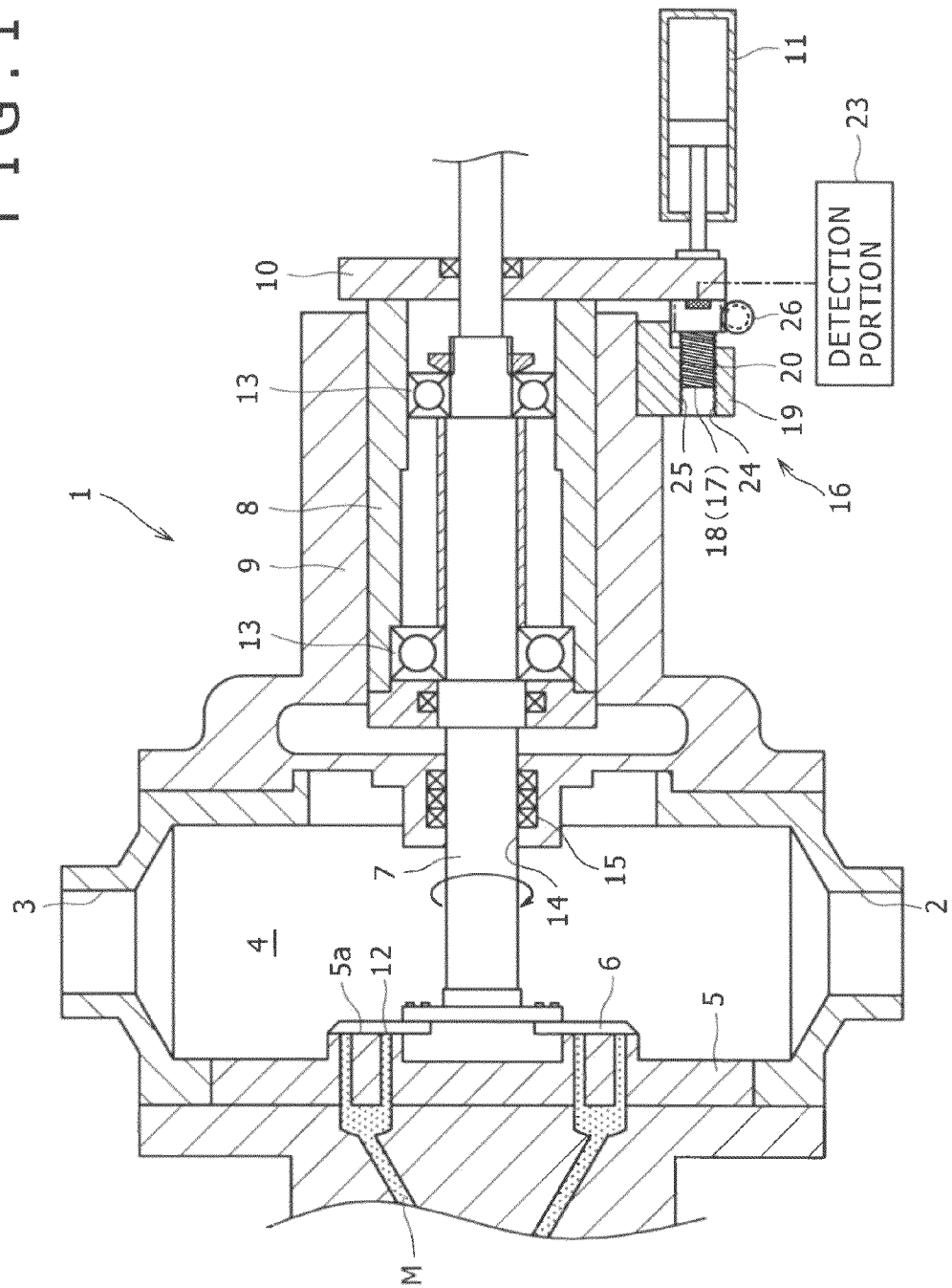
FIG. 1 is a front sectional view of a resin granulating apparatus according to a first embodiment.

As schematically shown in FIG. 1, the resin granulating apparatus 1 is provided with a cooling chamber (also called as a water chamber) 4 for distributing warm water (cooling water) from a supply port 2 on the lower side toward a discharge port 3 in the inside of the resin granulating apparatus 1 on the upstream side. A die 5 for extruding the molten resin material M and a cutter 6 for shearing the material M extruded from the die 5 are provided inside this cooling chamber 4. Thus, the molten resin material M is cut by predetermined length, cooled and coagulated so as to produce the pellet.

The cutter 6 is attached to an upstream end of a cutter shaft 7 through a cutter holder and supported rotatably around an axis by the cutter shaft 7. A sleeve 8 is provided on the outer peripheral side of this cutter shaft 7 on the downstream side. The sleeve 8 is arranged so as to support the cutter shaft 7 rotatably around the axis thereof through bearings 13 and 13, and move along the axial direction integrally with the cutter shaft 7. A housing 9 for supporting the sleeve 8 movably along the axial direction is provided on the outer peripheral side of this sleeve 8.

On the downstream side of the resin granulating apparatus 1, a bracket 10 extending in the outward radial direction beyond an outer peripheral surface of the sleeve 8 is provided at a downstream end of the sleeve 8. Pressing means 11 having a pressing element for pressing the sleeve 8 toward the die 5 through the bracket 10 is provided on the downstream side of this bracket 10.

It should be noted that in the following description, the direction parallel to the axis of the cutter shaft 7 on the paper of FIG. 1 indicates the axial direction in the explanation of the resin granulating apparatus 1. Further, the radial direction from the axis of the cutter shaft 7 indicates the radially outer side or the outward radial direction in the explanation of the resin granulating apparatus 1, and the direction from the radially outer side toward the axis of the cutter shaft 7 indicates the radially inner side or the inward radial direction.

The cooling chamber 4 having a hollow inside is formed on the upstream side of the resin granulating apparatus 1. The die 5 for extruding and bringing the resin material M into contact with an upstream wall surface of the cooling chamber 4 is attached inside the cooling chamber 4.

The die 5 is formed in a disc shape around the axis of the cutter shaft 7. A part of a downstream surface of the die 5 is protrudingly formed in a bank shape toward the downstream side. A die surface 5a is formed on a protruding end of the protrudingly formed bank-shape part.

A plurality of resin extruding holes 12 is formed in the die 5 so as to pass through the inside of the die 5. Upstream openings of these resin extruding holes 12 communicate with the inside of the extruder so as to supply the molten resin from the extruder to the die 5. The downstream side of the resin extruding holes 12 opens toward the surface 5a so as to extrude the material M from these downstream openings into the water.

The surface 5a is formed flatly and perpendicular to the axial direction so as to bring a blade edge of the cutter 6 described later into close contact with the surface 5a without any gap therebetween.

The cutter 6 is a blade portion for cutting the material M extruded from the resin extruding holes 12. The cutter 6 is attached so that the blade edge is perpendicular to the axial direction. Thus, the blade edge can be brought in close contact with the die surface 5a without any gap therebetween. When the cutter shaft 7 is rotated around the axis, the cutter 6 is rotated integrally with the cutter shaft 7 so as to cut the material M extruded into the water from the vicinity of the surface 5a. The material M cut as described above is carried and collected as the pellet by flow of the hot water.

The cutter shaft 7 is a member arranged along the axial direction and has the upstream end extending into the cooling chamber 4. The cutter shaft 7 on the downstream side of the cooling chamber 4 (an intermediate part of the cutter shaft 7) is rotatably supported by the sleeve 8 provided inside the resin granulating apparatus 1. A downstream end of the cutter shaft 7 is connected to a motor.

The sleeve 8 is formed in a substantially cylindrical shape around the axis, and the cutter shaft 7 is arranged inside thereof so as to pass through the inside along the axial direction. A plurality of (two in the present embodiment) axially-spaced bearing portions 13 are arranged on the inner peripheral side of the sleeve 8. These bearing portions 13 support the cutter shaft 7 rotatably relative to the sleeve 8 so as to regulate movement in the axial direction. The plate shape bracket 10 is fixedly provided on the downstream side of the sleeve 8 so as to be moved integrally with the sleeve 8.

The bracket 10 is attached so that a plate surface thereof is perpendicular to the axial direction. At least a part of an outer edge thereof extends to the radially outer side of the housing 9. The cutter shaft 7 is inserted into the bracket 10 through a shaft seal so as to pass through the bracket 10.

The housing 9 is formed in a tubular shape opening toward the downstream side, and the sleeve 8 is accommodated inside thereof so as to be slid in the axial direction. A through hole 14 passing through the inside of the housing 9 is formed on the upstream side of the housing 9 along the axial direction. The cutter shaft 7 is inserted into this through hole 14 so as to be moved in the axial direction. A shaft seal 15 placed in contact with an outer peripheral surface of the cutter shaft 7 so as to retain a water-tight state of the cooling chamber 4 is provided on an inner peripheral surface of the through hole 14. The cutter shaft 7 can be moved in the axial direction while the water-tight state of the cooling chamber 4 is retained by this shaft seal 15.

The pressing means 11 is means for pressing the bracket 10 toward the die 5 along the axial direction. A hydraulic cylinder is used as the pressing means 11 in the present embodiment. In this hydraulic cylinder, hydraulic pressure can be adjusted to predetermined hydraulic pressure by a command from the outside so as to adjust pressing force on the bracket 10 toward the die 5.

In the resin granulating apparatus 1 of the present invention, stopper means 16 cooperating with the bracket 10 to regulate movement of the sleeve 8 toward the die 5 and moving in the axial direction is provided on the radially outer side over an outer diameter of the sleeve 8.

The stopper means 16 of the first embodiment is provided with a regulating member 17 provided on the side of the housing 9 and movably in the axial direction. A front end of this regulating member 17 is abutted with the bracket 10 in the axial direction. More specifically, the front end of this regulating member 17 is abutted with the bracket 10 on the side of the die 5 along the axial direction. In the present embodiment, this regulating member 17 is attached to the side of the housing 9 through a screw mechanism and is a rod member 18 formed in a rod shape. A position thereof in the axial direction can be adjusted by changing a meshing state of the screw mechanism.

Figure 2A:
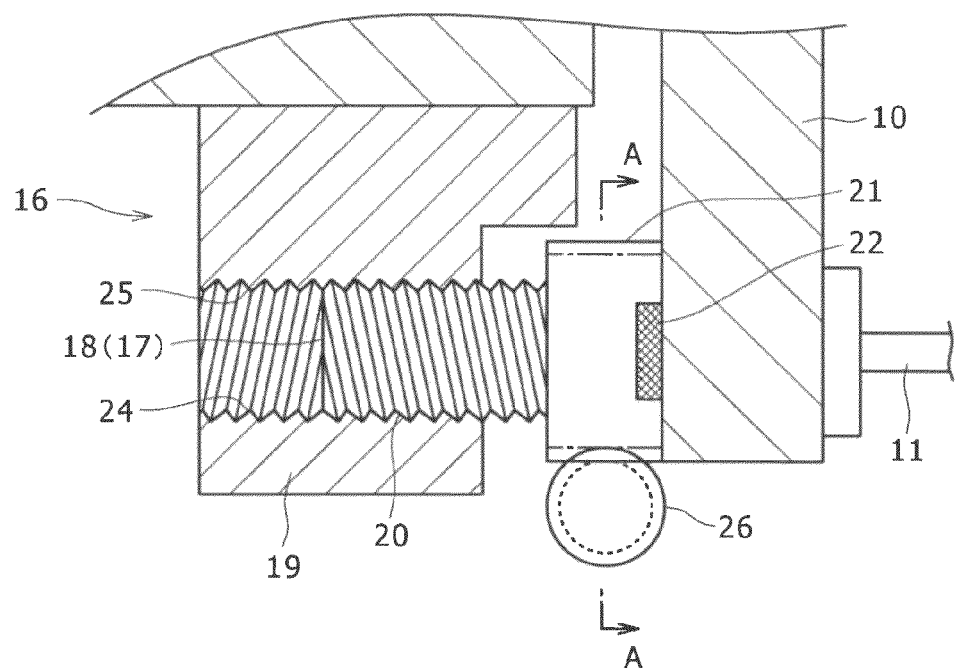
FIG. 2A is an enlarged sectional view of stopper means.

As shown in FIG. 2A, at least one rod member 18 (regulating member 17) is provided on an outer peripheral surface of the housing 9 around the axis. The rod member 18 is abutted with a surface of the bracket 10 on the side of the die 5 so as to regulate movement of the bracket 10 toward the die 5.

The rod member 18 in the present embodiment is formed in a convex shape like a screw in a side view (a shape in which two cylindrical columns having different outer diameters are continuously and concentrically combined with each other on the same axis) and the larger diameter side thereof is placed on the downstream side. The upstream side (a base end) of the rod member 18 is formed so as to have a smaller diameter than the downstream side thereof and inserted into the inside of a support member 19 attached to the outer peripheral surface of the housing 9. A male screw portion 20 forming the screw mechanism together with a female screw portion 25 of the support member 19 described later is formed on an outer peripheral surface of this rod member 18 on the upstream side (the smaller diameter side).

The downstream side of the rod member 18 is formed in a cylindrical column having a larger diameter than the upstream side, and a worm wheel portion 21 is formed on an outer peripheral surface thereof around an axis of the rod member 18. A downstream end surface of the rod member 18 is formed flatly and perpendicular to the axial direction of the cutter shaft 7 so as to be in surface contact with the bracket 10 in a state that the end surface faces a flat surface of the bracket 10.

A sensor 22 such as a pressure-sensitive sensor is buried in the downstream end surface of the rod member 18. A detection signal detected by this sensor 22 is outputted to a detection portion 23. Based on the detection signal inputted in the detection portion 23, force given from the bracket 10 to the rod member 18 is measured as the pressing force of the cutter 6 toward the die 5. In the resin granulating apparatus 1 of the present invention, the force of pressing the bracket 10 toward the die 5 by the pressing means 11 can be adjusted based on the pressing force of the cutter 6 toward the die 5 measured as described above.

The support member 19 is detachably attached to the outer peripheral surface of the housing 9 with using a fastening tool such as a bolt. An insertion hole 24 into which the upstream side of the rod member 18 is insertable is formed inside the support member 19 along the axial direction. The female screw portion 25 to be screwed onto the male screw portion 20 of the rod member 18 is formed on an inner peripheral surface of this insertion hole 24. The male screw portion 20 of the rod member 18 and the female screw portion 25 of the support member 19 form the screw mechanism for moving the regulating member 17 in the axial direction relative to the housing 9.

A worm gear 26 (a rotation mechanism) to be meshed with the worm wheel portion 21 (the rotation mechanism) provided on the rod member 18 so as to rotate the rod member 18 around the axis thereof is provided on the lower side of the rod member 18. This worm gear 26 is rotatably supported by the support member 19 and positively and negatively rotatable with using a drive mechanism (a motor for position control or a rotation handle) (not shown).

A relationship between a reduction ratio I of the rotation mechanism including this worm gear 26 and the worm wheel portion 21, and a pitch 'p' (mm) of the screw mechanism, in other words, a pitch of the male screw portion 20 of the rod member 18, and resolution performance 'm' (mm) of the rod member 18 which is a traveling distance of the regulating member (the rod member) (per one rotation of the worm gear) when one rotation is inputted into the rotation mechanism is set by the following expression (1):

$$I = 360/(m/p \times 360) \tag{1}$$

wherein I is the reduction ratio of the rotation mechanism, m is the resolution performance of the regulating member (the rod member) (mm), and p is the pitch of the screw mechanism (the regulating member) (mm).

According to the expression (1), in a case where the reduction ratio I of the rotation mechanism is 300 and the pitch 'p' of the screw mechanism of the rod member 18 is 3, and when the worm gear 26 is rotated 300 times, the worm wheel portion 21 is rotated once and at the same time the rod member 18 is rotated once so as to travel by 3 mm. That is, when the worm gear 26 is rotated once, the rod member 18 travels by 0.01 mm. When the expression (1) is satisfied as described above, the rod member 18 travels forward and rearward in accordance with rotation of the rod member 18 by the worm gear 26 (the rotation mechanism) and a position thereof is strictly changed. Thus, it is possible to precisely adjust a position of the rod member 18. The traveling distance of the rod member per one rotation of the worm gear (the resolution performance of the regulating member) is set to be a value of a round number as described above, a traveling amount of the rod member is easily understood and the position of the rod member is easily adjusted.

Now, a method of adjusting a position of the cutter 6 relative to the die 5 will be described.

Figure 2B:
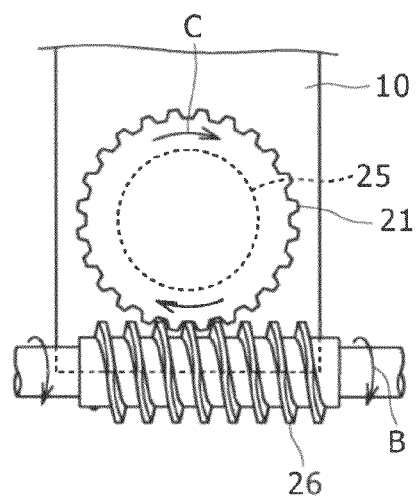
FIG. 2B is a sectional view taken from line A-A of FIG. 2A.

When the position of the cutter 6 relative to the die 5 is to be changed to the upstream side, the worm gear 26 is driven and rotated in the positive direction (the arrow B direction in FIG. 2B) and the rod member 18 is rotated in the forward direction (the arrow C direction in FIG. 2B) through the worm wheel portion 21. And the rod member 18 is consequently moved to the upstream side while rotated by the screw mechanism, and a position of the downstream end surface of the rod member 18 is also moved to the upstream side. As a result, a regulation position of the bracket 10 is changed to the upstream side so as to determine a regulation position of the cutter 6 relative to the die 5.

Meanwhile, when the regulation position of the cutter 6 is to be changed to the downstream side, the worm gear 26 is driven and rotated in the negative direction (the direction opposite to the arrow B direction in FIG. 2B), so that the rod member 18 is rotated in the rearward direction (the direction opposite to the arrow C direction in FIG. 2B) through the worm wheel portion 21. Thus, the rod member 18 is moved to the downstream side while rotated by the screw mechanism, and the position of the downstream end surface of the rod member 18 is also moved to the downstream side. As a result, the regulation position of the bracket 10 is moved to the downstream side, and the regulation position of the cutter 6 is determined on the more downstream side.

With regard to the bracket 10 extending over the radially outer side of the sleeve 8 as described above, since the movement of the bracket 10 toward the die 5 is regulated with using the stopper means 16, there is no need for providing installation space of the stopper means 16 in the axial direction. Thus, in comparison to a case where the stopper means 16 is arranged in the housing 9, the installation space in the axial direction can be compactified. Therefore, it is possible to additionally install the stopper means in the existing facilities with limited installation space in the axial direction.

Since the stopper means 16 is not attached in the housing 9, the cutter shaft 7 is not elongated. Therefore, the cutter shaft 7 is not easily bent and deflected, and the blade of the cutter 6 is easily held in a proper posture relative to the die surface 5a. As a result, it is possible to cut the material M while the blade of the cutter 6 is surely in surface contact with the die surface 5a, so that a pellet of a good shape is easily and stably obtained.

Further, the rod member 18 attached to the side of housing 9 through the screw mechanism as described above is adopted as the regulating member 17, the rod member 18 can be moved by the screw mechanism with small drive force, and the position of the rod member 18 can be strictly set or changed so as to highly precisely adjust the position of the cutter 6 relative to the die 5 (the die surface 5a).

[Second Embodiment]

Now, stopper means 16 of a second embodiment will be described.

Figure 3:
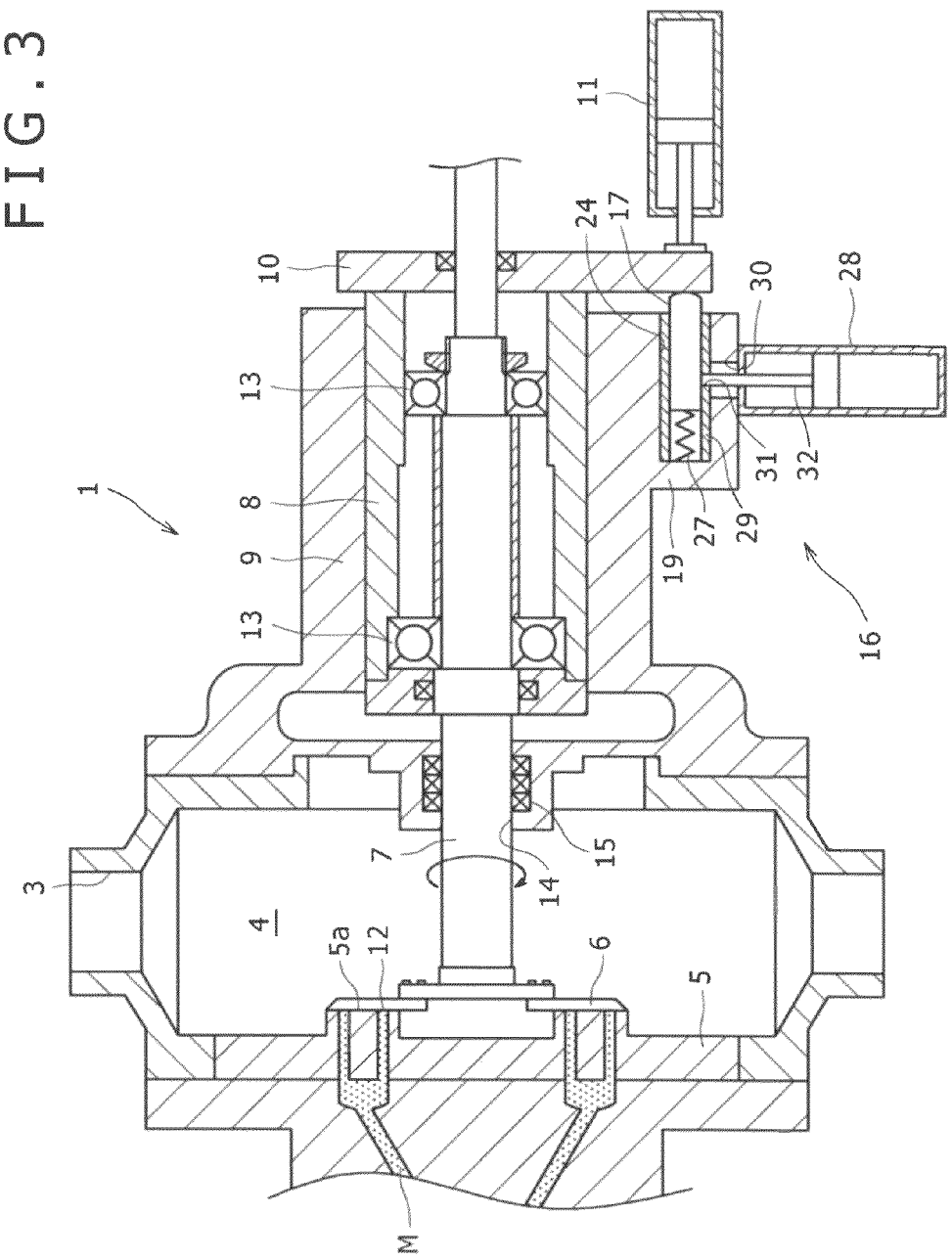
FIG. 3 is a front sectional view of a resin granulating apparatus according to a second embodiment.

As shown in FIG. 3, the stopper means 16 of the second embodiment includes a rod shape regulating member 17 attached on the side of the housing 9 movably in the axial direction, an elastic member 27 for pressing the regulating member 17 toward the bracket 10, and a lock member 28 abutted with the regulating member 17 pressed toward the bracket 10 for regulating the movement of the regulating member 17 along the axial direction. This point above is different from the first embodiment.

Specifically, the support member 19 of the second embodiment is integrally formed on the outer peripheral surface of the housing 9. An insertion hole 24 formed in a bottomed cylinder shape along the axial direction and opening toward the downstream is formed inside this support member 19. A sleeve member 29 for guiding the regulating member 17 is inserted into the insertion hole 24 of the support member 19. A pin hole 30 providing communication between the inside and the outside of the insertion hole 24 in the radial direction is formed on the lower side of the support member 19.

The sleeve member 29 is formed in a hollow cylinder shape around the axial direction so as to open toward the upstream and downstream sides. The sleeve member 29 is inserted into the insertion hole 24 of the support member 19 so that a bottom surface of the insertion hole 24 is abutted with a downstream end surface of the sleeve member 29. The rod shape regulating member 17 and the elastic member 27 made of a compression spring are inserted into the inside of the sleeve member 29. A cutout portion 31 providing communication between the inside and the outside is formed on a lower wall surface of the sleeve member 29 corresponding to the pin hole 30 of the insertion hole 24.

The regulating member 17 is formed in a rod shape along the axial direction, and a downstream end thereof is in contact with an upstream end surface of the bracket 10. The regulating member 17 is moveable in the axial direction relative to the insertion hole 24 of the support member 19. A part of the outer peripheral surface thereof is cut out along the longitudinal direction at least within a range of movement so as to form a flat surface portion.

The elastic member 27 is provided inside the sleeve member 29, and arranged adjacent to the upstream side of the regulating member 17. The elastic member 27 exerts elastic restoring force to the bottom surface (an upstream end surface) of the insertion hole 24 in the axial direction so as to bias (press) the regulating member 17 toward the downstream side at least within a range of adjusting the position of the regulating member 17.

It should be noted that the restoring force of the elastic member 27 is set to be a value required for sliding the regulating member 17 toward the downstream side which is sufficiently smaller than the pressing force of the pressing means 11.

The lock member 28 is to regulate the movement of the regulating member 17 along the axial direction. In the present embodiment, a hydraulic cylinder arranged on the lower side of the regulating member 17 is adopted as the lock member 28. The lock member 28 is provided with a lock pin 32 (a cylinder rod) extendable along the up and down direction (the radial direction of the regulating member 17) by hydraulic pressure. An upper end of this lock pin 32 passes through the pin hole 30 of the support member 19 and the cutout portion 31 of the sleeve member 29 and is extendable to a position where the upper end is abutted with the flat surface portion provided on the outer peripheral surface of the regulating member 17.

Therefore, when the lock pin 32 of the lock member 28 is abutted with the outer peripheral surface of the regulating member 17 so as to press the regulating member 17, the regulating member 17 is not moved in the axial direction, and the bracket 10 and the cutter 6 moved integrally with this bracket 10 are also positioned so as not to be moved to the upstream side.

By this, for example when the position of the cutter 6 is moved to the upstream side by a fixed time period, the lock pin 32 is retreated into the cutout portion 31 with using the hydraulic pressure so as to temporarily release regulation on the movement of the regulating member 17. Then, the regulating member 17 is moved to the upstream side by the pressing force of the pressing means 11 which is sufficiently larger than bias force of the elastic member 27 toward the downstream side. After the cutter 6 is brought into contact with the die 5 and the movement of the regulating member 17 is stopped, the lock pin 32 is moved upward with using the hydraulic pressure again. By this, the lock pin 32 is abutted with the regulating member 17 so as to regulate the movement of the regulating member 17, and the movement of the bracket 10 toward the die 5 is regulated again. The lock pin 32 is desirably brought into flat surface contact with the regulating member 17 so as to increase a contact area. This produces an advantage that the position of the regulating member 17 is easily fixed.

With the lock member 28 provided as described above, when the regulation position of the regulating member 17 is changed by the fixed time period as described above, the regulation position can be changed with a simple structure.

It should be noted that the second embodiment is the same as the first embodiment except the configuration and the effect described above.

[Third Embodiment]

Now, stopper means 16 of a third embodiment will be described.

Figure 4:
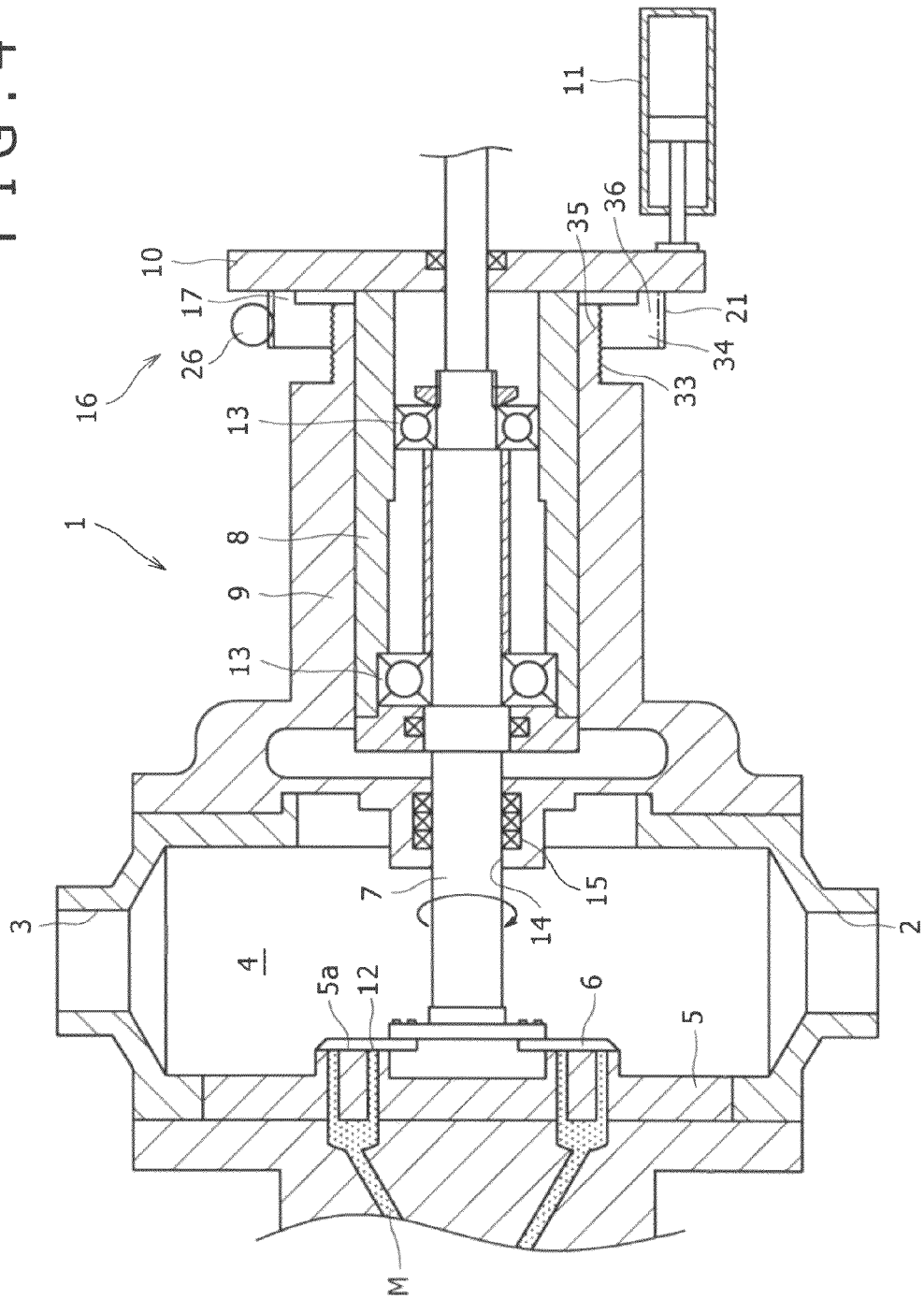
FIG. 4 is a front sectional view of a resin granulating apparatus according to a third embodiment.

As shown in FIG. 4, the stopper means 16 of the third embodiment is different from the first and second embodiments in a point that a first screw portion 33 (a male screw portion) is formed on the outer peripheral side of the housing 9 around the axis, and the stopper means 16 is provided with a ring shape regulating member 17 having a second screw portion 35 (a female screw portion) to be screwed onto the first screw portion 33. That is, in the present embodiment, this regulating member 17 is a ring member 34 provided in a circular shape around an axis of the housing 9, and the position of the ring member 34 in the axial direction can be adjusted by changing a meshing state of both the screw portions 33 and 35.

The ring member 34 is formed in a circular shape, and the second screw portion 35 to be screwed onto the first screw portion 33 is formed on an inner peripheral surface thereof. Therefore, when the ring member 34 is rotated around the axis of the housing 9, the second screw portion 35 is screwed onto the first screw portion 33 so that the ring member 34 is moved along the axial direction while rotated relative to the housing 9.

The worm wheel portion 21 is formed on an outer peripheral surface of the ring member 34. The worm gear 26 is attached to this worm wheel portion 21 from the outside so as to be meshed with this worm wheel portion 21. When the worm gear 26 is rotated, the ring member 34 is driven and rotated around the axis of the housing 9 through the worm wheel portion 21.

A flat regulation surface 36 perpendicular to the axial direction is formed on a downstream end surface of the ring member 34. The regulating member 17 regulates the movement of the bracket 10 toward the die 5 by bringing the regulation surface 36 into surface contact with the bracket 10.

Therefore, for example when the position of the cutter 6 relative to the die 5 is to be changed to the upstream side, the worm gear 26 is driven and rotated in the positive direction as well as the first embodiment and the ring member 34 is rotated in the forward direction through the worm wheel portion 21. Then, the ring member 34 is moved to the upstream side while rotated, and the regulation surface 36 is also moved to the upstream side. The movement of the bracket 10 toward the die 5 is regulated on the more upstream side so as to determine the regulation position of the cutter 6 relative to the die 5.

Meanwhile, when the regulation position of the cutter 6 is to be changed to the downstream side, the worm gear 26 is driven and rotated in the direction which is opposite to the direction for determining the regulation position of the cutter 6 relative to the die 5 on the upstream side. By this, the ring member 34 is moved to the downstream side, and the regulation surface 36 is also moved to the downstream side. Thus, the movement of the bracket 10 toward the die 5 is regulated on the more downstream side, and the regulation position of the cutter 6 relative to the die 5 is determined on the more downstream side.

With the stopper means 16 using such a ring member 34, there is no need for providing large installation space in the radial direction as well. Thus, the installation space can be further compactified. Therefore, for example, even in a case where sufficient space is not ensured around the housing 9, the stopper means 16 can be provided, and therefore is particularly useful at the time of additionally installing the stopper means 16 in the existing facilities with highly limited installation space.

[Fourth Embodiment]

Now, stopper means 16 of a fourth embodiment will be described.

Figure 5:
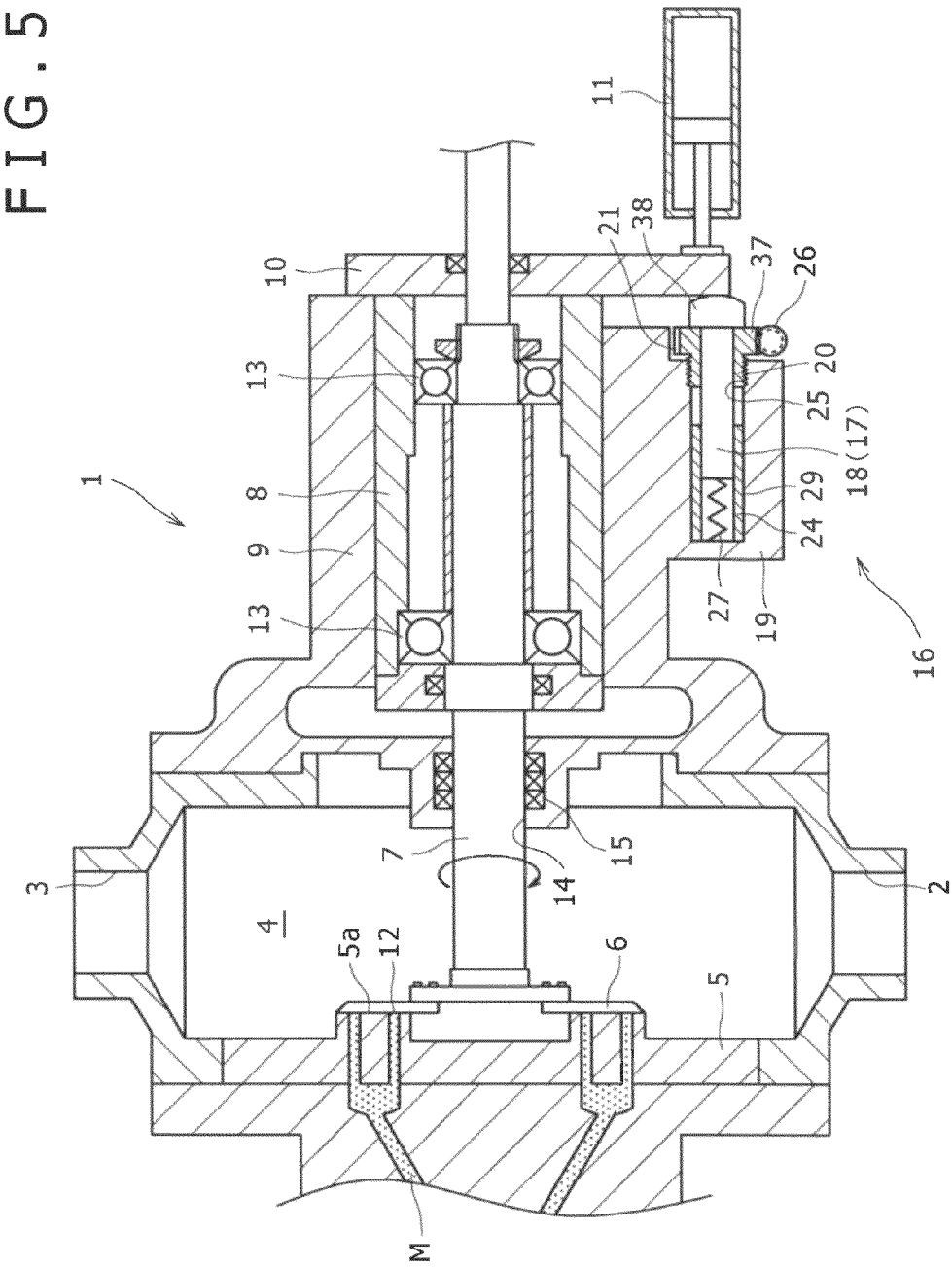
FIG. 5 is a front sectional view of a resin granulating apparatus according to a fourth embodiment.

As shown in FIG. 5, the stopper means 16 of the fourth embodiment is provided with a socket member 37 attached to the side of the housing 9 through the screw mechanism, a rod member 18 (a rod shape regulating member 17) inserted into this socket member 37 so that the movement of the rod member 18 toward the die 5 is restricted and the movement thereof toward the bracket 10 is free and abutted with the bracket 10 for regulating the movement of the sleeve 8 in the axial direction, and the elastic member 27 for pressing this rod member 18 toward the bracket 10.

More specifically, a head portion 38 is formed on the downstream side of the rod member 18 of the fourth embodiment so as to have a larger diameter than the upstream side. A top part of this head portion 38 is formed in a spherical surface toward the bracket 10. Since the top part of the head portion 38 of the rod member 18 is formed in a spherical surface as described above, a contact area of the rod member 18 with the bracket 10 is reduced, and the rod member 18 is easily rotated relative to the bracket 10.

The socket member 37 is formed in a hollow cylinder shape, and the rod member 18 is inserted into the cylinder movably in the axial direction. The downstream side of the socket member 37 is formed in a flange shape having a larger diameter than the upstream side. This flange shape part is abutted with an upstream end surface of the head portion 38 of the rod member 18. The rod member 18 is guided by the sleeve member 29 on the upstream side, and an upstream end thereof is pressed toward the side of the bracket 10 at least within a range of adjusting the position of the regulating member 17 by the restoring force of the elastic member 27 provided in the sleeve member 29 and made of a compression spring. The rod member 18 is pressed toward the upstream side by the pressing means 11. Here, the restoring force of the elastic member 27 is set to be a value required for sliding the rod member 18 toward the downstream side which is sufficiently smaller than the pressing force of the pressing means 11. Therefore, the rod member 18 (the regulating member 17) is moved in the axial direction while abutted with the bracket 10, and the movement toward the upstream side is regulated by the flange shape part of the socket member 37. When the socket member 37 is moved in the axial direction, a position of the flange shape part is also moved in the axial direction so as to adjust the regulation position of the rod member 18 (the regulating member 17).

The worm wheel portion 21 is formed on a downstream outer peripheral surface of the socket member 37. The socket member 37 can be rotated positively and negatively by the worm gear 26 inserted from the outside to be meshed with the worm wheel portion 21. The male screw portion 20 is formed on an upstream outer peripheral surface of the socket member 37 as well as the first embodiment. The female screw portion 25 to be screwed onto the male screw portion 20 is formed on the inner peripheral surface of the insertion hole 24. The socket member 37 is rotated relative to the insertion hole 24 so as to move the socket member 37 in the axial direction.

Therefore, with the stopper means 16 of the fourth embodiment, when the worm wheel portion 21 is rotated with using the worm gear 26, the socket member 37 is rotated, and this socket member 37 is moved in the axial direction while rotated relative to the insertion hole 24. When the socket member 37 is moved in the axial direction, the regulation position of the rod member 18 determined by the flange shape part of the socket member 37 is also moved in the axial direction. Thus, the bracket 10 is abutted with the head portion 38 of the rod member 18 on the more upstream or downstream side, so that the regulation position of the cutter 6 relative to the die 5 is adjusted in the axial direction.

The present invention is not limited to the embodiments above but may be properly modified in terms of a shape of parts, a structure, a material, combination and the like within a range not departing from the claims.

For example, in the embodiments above, only one rod member 18 is provided around the axis of the cutter shaft 7 in the resin granulating apparatus 1 of the present invention, as an example. However, a plurality of rod members 18 may be provided around the axis of the cutter shaft 7.

In the second embodiment above, the movement of the regulating member 17 in the axial direction is regulated by the lock pin 32 extended and retreated by the hydraulic pressure in the stopper means 16, as an example. However, in the stopper means 16 for regulating the movement of the regulating member 17 in the axial direction, for example, a plurality of dents may be formed on the side of the regulating member 17 along the axial direction and a front end of the lock pin 32 may be engaged with a proper position of the dents, or the lock pin 32 may be extended and retreated by means other than the hydraulic pressure such as an electrical operation.

In the third embodiment above, the downstream end surface of the ring member 34 formed in a circular shape is directly abutted with the bracket 10 in the stopper means 16 of the resin granulating apparatus 1 of the present invention, as an example. However, for example, a plurality of protruding portions may be provided on the downstream end surface of the ring member 34, and these protruding portions may be abutted with the bracket 10.

In the fourth embodiment above, the regulating member 17 (the rod member 18) on the contact side with the bracket 10 is formed in a spherical surface. However, a structure other than the spherical surface may be adopted as a structure for easily rotating the rod member 18 relative to the bracket 10. For example, the regulating member 17 may be tapered off on the side of the bracket 10 or a rolling member such as a ball and a roller may be provided on the side of the regulating member 17 so that the regulating member 17 is abutted with the bracket 10 through this member.

In the first embodiment above, the force given from the bracket 10 to the rod member 18 is measured by the sensor 22 attached to the downstream end surface of the rod member 18, as an example. However, the sensor 22 may be installed at other positions. For example, the sensor 22 may be arranged on an upstream end surface of the bracket 10 so as to correspond to the rod member 18, or an output value of the pressing means 11 (the hydraulic pressure in a case of the hydraulic cylinder) may be used as the pressing force of the cutter 6 toward to the die 5.

The force of pressing the bracket 10 by the pressing means 11 and the position of the rod member 18 may be adjusted in accordance with mechanical power of the motor connected to the cutter shaft 7. For example, when the cutter 6 is strongly pressed onto (in contact with) the die 5, friction between the die 5 and the cutter 6 increases the mechanical power of the motor. However, when contact stress is reduced due to abrasion of the cutter 6, the mechanical power of the motor is decreased. Therefore, by changing the pressing force by the pressing means 11 in accordance with the mechanical power of the motor and adjusting the position of the rod member 18 in accordance with the change of the pressing force as described above, it is possible to adjust the pressing force of the cutter 6 to be optimal one in accordance with an abrasion state.

In the embodiments above, the pressing means 11 for moving the bracket 10 in the axial direction is desirably provided at a position facing the regulating member 17 while sandwiching the bracket 10 between the means 11 and the member 17. Thereby, since a state in which the bracket 10 is surely abutted with the regulating member 17 can be easily obtained, it is possible to easily and precisely position the sleeve 8 for supporting the cutter shaft 7.

In the embodiments above, the pressing means 11 is provided on the downstream side of the bracket 10. However, the pressing means 11 may be provided on the upstream side of the bracket 10 with a condition that the pressing means 11 is placed on the radially outer side of the housing 9 so as to avoid the stopper means 16. In this case, the pressing means 11 is desirably attached to the housing 9 so as to be placed at two points respectively on both sides of the cutter shaft 7 in a plane including the axis of the cutter shaft 7.

In the first embodiment, the support member is provided so as to be a separate member from the housing 9. However, the support member may be formed integrally with the housing 9. Similarly, in the second and fourth embodiments, the support member is formed integrally with the housing 9. However, the support member may be provided so as to be a separate member from the housing 9.

We claim:

1. A resin granulating apparatus, comprising:
   a die;
   a cutter for shearing a molten resin material extruded from said die;
   a cutter shaft for rotating said cutter around an axis;
   a sleeve for supporting said cutter shaft rotatably around the axis, said sleeve being arranged so as to move along an axial direction integrally with said cutter shaft;
   a housing for supporting said sleeve movably along the axial direction;
   a pressing element for applying a pressing force to said sleeve, toward said die in the axial direction;
   a bracket provided for said sleeve, said bracket extending in the outward radial direction beyond an outer peripheral surface of said sleeve;
   a stopper provided on the radially outer side beyond an outer diameter of said sleeve, said stopper cooperating with said bracket to regulate movement of said sleeve toward said die, said stopper being configured to adjust a position to which the movement of said sleeve toward said die is regulated in the axial direction, wherein said stopper is provided with a regulating member movable in the axial direction, wherein said stopper and said regulating member being located on the same side of said bracket as said housing in the axial direction, and having a front end abutted with said bracket in the axial direction, and
   wherein said pressing element is provided at another side of said bracket opposite to the side of said stopper and regulating member in the axial direction.

2. The resin granulating apparatus according to claim 1, wherein said regulating member is a rod shape regulating member attached to the side of said housing through a screw mechanism, and a position of said regulating member in the axial direction is adjustable by changing a meshing state of said screw mechanism.

3. The resin granulating apparatus according to claim 1, wherein said stopper is provided with an elastic member for pressing said regulating member toward said bracket, and a lock member abutted with said regulating member pressed toward said bracket for regulating movement of said regulating member along the axial direction.

4. The resin granulating apparatus according to claim 1, wherein said regulating member is a rod shape regulating member, said stopper has a socket member attached to the side of said housing through a screw mechanism, and an elastic member for pressing said regulating member toward said bracket, and said regulating member is inserted into said socket member so that movement of said regulating member toward said die is restricted and movement thereof toward said bracket is free, and abutted with said bracket for regulating the movement of said sleeve in the axial direction.

5. The resin granulating apparatus according to claim 4, wherein an end of said regulating member on the side of said bracket is formed in a spherical surface.

6. The resin granulating apparatus according to claim 2, wherein said stopper is provided with a support member for supporting a base end of said regulating member, and said support member is detachably attached to said housing.

7. The resin granulating apparatus according to claim 2, wherein a rotation mechanism for reducing inputted rotation by a predetermined reduction ratio and rotating said regulating member around the axis is provided for said regulating member, and a relationship between a reduction ratio I of said rotation mechanism, and resolution performance 'm' of said regulating member which is a traveling distance of said regulating member when one rotation is inputted into said rotation mechanism and a pitch 'p' of said screw mechanism is set by the following expression (1):

$$I=360/(m/p\times 360) \tag{1}$$

wherein I is the reduction ratio of said rotation mechanism, m is the resolution performance of said regulating member (mm), and p is the pitch of said screw mechanism (mm).

8. The resin granulating apparatus according to claim 4, wherein a rotation mechanism for reducing inputted rotation by a predetermined reduction ratio and rotating said socket member around the axis is provided for said socket member, and a relationship between a reduction ratio I of said rotation mechanism, and resolution performance 'm' of said regulating member which is a traveling distance of said regulating member when one rotation is inputted into said rotation mechanism and a pitch 'p' of said screw mechanism is set by the following expression (1):

$$I=360/(m/p\times 360) \tag{1}$$

wherein I is the reduction ratio of said rotation mechanism, m is the resolution performance of said regulating member (mm), and p is the pitch of said screw mechanism (mm).

9. The resin granulating apparatus according to claim 1, wherein a motor for rotating said cutter shaft around the axis is connected to said cutter shaft, and a position of said regulating member in the axial direction is adjusted in accordance with mechanical power of said motor.

10. A resin granulating apparatus, comprising:

a die;

a cutter for shearing a molten resin material extruded from said die;

a cutter shaft for rotating said cutter around an axis;

a sleeve for supporting said cutter shaft rotatably around the axis, said sleeve being arranged so as to move along an axial direction integrally with said cutter shaft;

a housing for supporting said sleeve movably along the axial direction;

a pressing element for applying a pressing force to said sleeve toward said die in the axial direction;

a bracket provided for said sleeve, said bracket extending in the outward radial direction beyond an outer peripheral surface of said sleeve;

a stopper provided on the radially outer side beyond an outer diameter of said sleeve, said stopper cooperating with said bracket to regulate movement of said sleeve toward said die, said stopper being configured to adjust a position to which the movement of said sleeve toward said die is regulated, in the axial direction, wherein said stopper is provided with a regulating member movable in the axial direction, wherein said stopper and said regulating member being located on the same side of said bracket as said housing in the axial direction, and having a front end abutted with said bracket in the axial direction, and a sensor provided between said bracket and said regulating member for measuring a pressing force of said cutter toward said die.

* * * * *